United States Patent [19]

Zifferer et al.

[11] Patent Number: 5,276,811
[45] Date of Patent: Jan. 4, 1994

[54] METHOD FOR EMULATING PROGRAMMABLE LOGIC CONTROLLER BY EXCHANGING INFORMATION BETWEEN DEBUG PROGRAM WHICH EMULATES I/O DEVICES AND LADDER LOGIC PROGRAM

[75] Inventors: Scott C. Zifferer, Mequon; Joseph J. Menter, Jr., Milwaukee, both of Wis.

[73] Assignee: ICOM, Inc., West Allis, Wis.

[21] Appl. No.: 41,128

[22] Filed: Mar. 31, 1993

Related U.S. Application Data

[63] Continuation of Ser. No. 373,920, Jun. 30, 1989, abandoned.

[51] Int. Cl.[5] ............... G06F 9/455; G06F 9/305
[52] U.S. Cl. ........................... 345/275; 364/243; 364/926.9; 364/949; 364/DIG. 2; 364/191; 345/700; 345/500
[58] Field of Search .............. 395/275, 700, 500; 364/147, 191

[56] References Cited

U.S. PATENT DOCUMENTS

| | | | |
|---|---|---|---|
| 3,686,639 | 8/1972 | Fletcher et al. | 395/500 |
| 3,813,649 | 5/1974 | Struger et al. | 395/275 |
| 3,882,305 | 5/1975 | Johnstone | 365/551.02 |
| 3,938,101 | 2/1976 | Lewis et al. | 395/500 |
| 3,964,026 | 6/1976 | Yamauchi et al. | 395/141 |
| 4,031,517 | 6/1977 | Hirtle | 395/500 |
| 4,038,533 | 7/1977 | Dummermuth et al. | 364/136 |
| 4,080,650 | 4/1978 | Beckett | 395/500 |
| 4,200,914 | 4/1980 | Kintner | 364/147 |
| 4,227,247 | 10/1980 | Kintner | 364/147 |
| 4,244,034 | 1/1981 | Cherba | 364/147 |
| 4,244,034 | 1/1981 | Cherba | 364/147 |
| 4,247,901 | 1/1981 | Martin et al. | 395/775 |
| 4,275,441 | 6/1981 | Takeuchi | 395/575 |
| 4,298,958 | 11/1981 | Takaki et al. | 395/275 |
| 4,316,260 | 2/1982 | Hideshima | 364/144 |
| 4,396,974 | 8/1983 | Imazeki et al. | 364/138 |
| 4,415,965 | 11/1983 | Imazeki | 364/136 |
| 4,445,169 | 4/1984 | Wakiti et al. | 364/147 |
| 4,449,180 | 5/1984 | Ohshima et al. | 364/147 |
| 4,455,619 | 6/1984 | Masui et al. | 395/160 |
| 4,486,830 | 12/1984 | Taylor, Jr. et al. | 364/146 |
| 4,488,258 | 12/1984 | Struger et al. | 395/146 |
| 4,504,900 | 3/1985 | Yomogida et al. | 364/140 |
| 4,544,997 | 8/1985 | Furgerson | 345/425 |
| 4,616,307 | 10/1986 | Kusumi et al. | 364/147 |
| 4,635,183 | 1/1987 | Isobe et al. | 364/141 |
| 4,644,478 | 2/1987 | Stephens et al. | 364/550 |
| 4,661,899 | 4/1987 | Usuda | 364/167 |
| 4,663,704 | 5/1987 | Jones et al. | 364/188 |
| 4,703,414 | 10/1987 | Inoue et al. | 364/147 |
| 4,802,116 | 1/1989 | Ward et al. | 395/500 |
| 4,812,975 | 3/1989 | Adachi et al. | 395/500 |
| 4,815,014 | 3/1989 | Lipner et al. | 364/550 |
| 4,833,592 | 5/1989 | Yamanaka | 364/138 |
| 4,843,538 | 6/1989 | Lane et al. | 364/188 |
| 4,918,594 | 4/1990 | Onizuka | 395/500 |
| 5,151,984 | 9/1992 | Newman et al. | 395/500 |

Primary Examiner—Thomas C. Lee
Assistant Examiner—Paul R. Lintz
Attorney, Agent, or Firm—Merchant, Gould, Smith, Edell, Welter & Schmidt

[57] ABSTRACT

The present invention discloses a software package for developing ladder logic programs for Programmable Logic Controllers (PLCs). The present invention provides a method of troubleshooting ladder logic programs for a programmable logic controller. The ladder logic program is debugged using an emulator executing on a computer. The emulator executes a second ladder logic program. The second ladder logic program generates the inputs that drive the ladder logic program being debugged. The second ladder logic program is comprised of output instructions that drive input instructions in ladder logic program being debugged. Thus, the emulator simulates the operation of the programmable logic controller.

7 Claims, 8 Drawing Sheets

```
OFFLINE  Prj:SEQ2    Mode:Prog   Bkp:Dis Frc:No   RUNG 2:0/5

Dry Mat                                      Dry
Level Sense                                  Material
True=OK                                      Low
LS_DRY_MAT                                   Alarm
   ─]/[─                                     true=on
                                             ALARM_DRY_MATL
                                                 ─(L)─
                                              [OAD]

Liquid                                       Liquid
Level Sense                                  Feed
True=OK                                      Low Alarm
LS2                                          True=low
LS2_LIQ_LVL_OK                               ALARM_LIQ_LOW
   ─]/[─                                         ─(L)─
                                              [OAD]

Mixing                                       Mixing
Level Sense                                  Not Ready
Path:Top:Mode                 Cmd:.M_
┌──┬───────┬──────┬─────┬──────┬──┬───────┬──┬───────┬──────┐
│F1│  F2   │  F3  │ F4  │  F5  │F6│  F7   │F8│  F9   │ F10  │
│Pr│Emulate│Single│eNadh│Unload│  │selRung│  │enaBrk │ Help │
└──┴───────┴──────┴─────┴──────┴──┴───────┴──┴───────┴──────┘
 48    50      52    54    56        58        60      62
```

| Maximum Number of Elements | File Type | File Number | 16-bit Words per Element |
|---|---|---|---|
| 32 | Output Image | 0 | 1 |
| 32 | Input Image | 1 | 1 |
| 32 | Status | 2 | 1 |
| 1000 | Bit | 3 | 1 |
| 1000 | Timer | 4 | 3 |
| 1000 | Counter | 5 | 3 |
| 1000 | Control | 6 | 3 |
| 1000 | Integer | 7 | 1 |
| 1000 | Floating Point | 8 | 2 |
| 1000 | User Assigned | 9-999 | 1 |

FIG. 8

| IF (Condition) | Then (Action) |
|---|---|
| Input Bit 01 is On | Turn Output Bit 01 On |

METHOD FOR EMULATING PROGRAMMABLE LOGIC CONTROLLER BY EXCHANGING INFORMATION BETWEEN DEBUG PROGRAM WHICH EMULATES I/O DEVICES AND LADDER LOGIC PROGRAM

This is a continuation of application Ser. No. 07/373,920, filed Jun. 30, 1989, which was abandoned upon the filing hereof.

FIELD OF THE INVENTION

This invention relates generally to methods of developing ladder logic programs for Programmable Logic Controllers (PLCs). In particular, is directed to a method of emulating PLCs in a computer-based development system to speed the troubleshooting of ladder logic programs.

BACKGROUND OF THE INVENTION

Programmable logic controllers (PLCs) perform many of the control functions for assembly line machines, machine tools, and other types of industrial equipment. For example, a part arriving at a workstation may contact and close a limit switch or other type of sensing device As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

Figure 6:
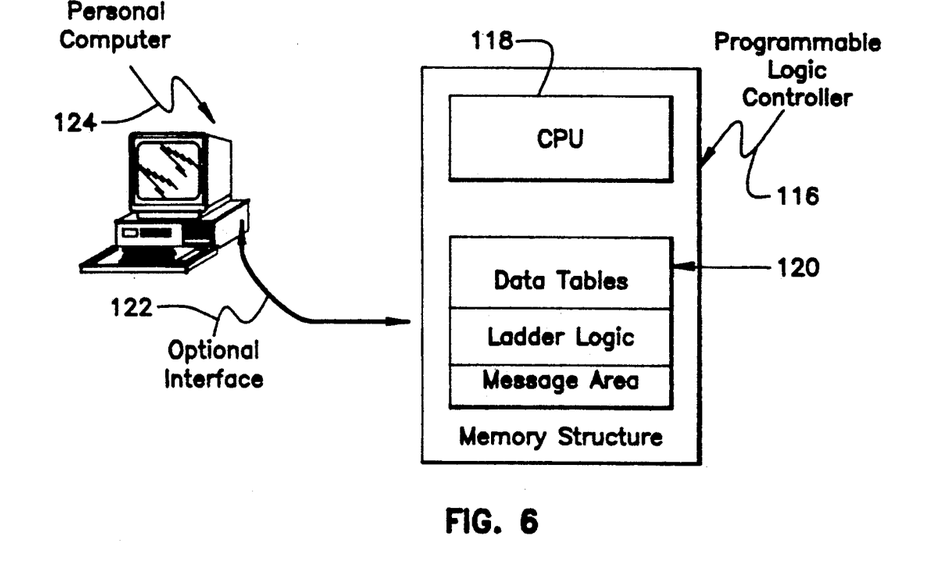
FIG. 6 is an illustration describing a programmable logic controller with an optional computer attached thereto.

A PLC is comprised of a processor, memory, input modules, and output modules. FIG. 6 shows a PLC processor 118 and memory 120, wherein the PLC 116 is (optionally) connected 122 to a personal computer 124. Ladder logic programs may be developed on the personal computer 124 and then downloaded to the PLC 116. The PLC processor 118 executes the ladder logic program. The memory 120 stores output image tables, input image tables, timer storage, counter storage, and ladder logic program workspace. The input modules connect the PLC 116 to input devices and can receive both digital and analog signals. The output modules connect the PLC 116 to machines or other devices and can transmit either digital or analog signals to control them.

Figure 8:
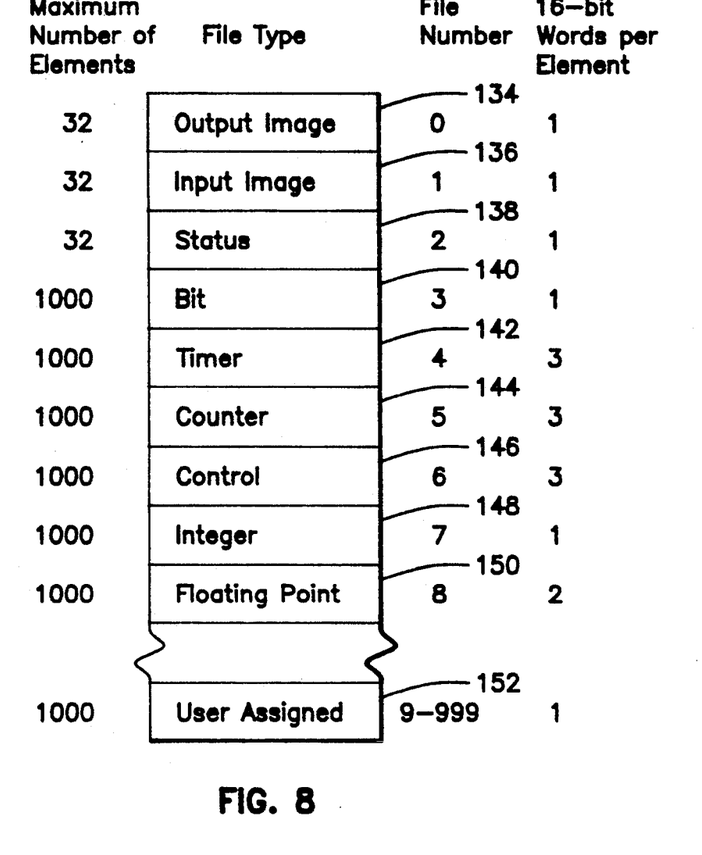
FIG. 8 is an illustration describing the memory structure of the programmable logic controller.

In most PLCs, such as those manufactured by the Allen-Bradley Company, memory is structured into "Data Table files" 134-152 as shown in FIG. 8. The memory may be divided into as many as 1000 different Data Table files 134-152. There are a plurality of different types of Data Table files 134-152, each serving a different purpose. These Data Table files comprise the Input Image 136, Output Image 134, Status 138, Bit 140, Timer 142, Counter 144, Control 146, Integer 148, and Floating Point 150 files.

The Input Image Data Table file 136 maintains the status of inputs to the PLC. A single bit in the Input Image Data Table file 136 represents the status of a single I/O point on an input module. If an input bit is ON, then a signal has been received at the input module. If the input bit is OFF, then no signal has been received at the input module.

The Output Image Data Table file 134 controls the outputs from the PLC. A single bit in the Output Image Data Table file 134 represents the status of a single I/O point on an output module. If an output bit is ON, then the PLC sends a signal to the output module. If the output bit is OFF, then the PLC does not send a signal to the output module.

The Timer Data Table file 142 reflects the status of timers executing in the ladder logic program. Timers keep track of timed intervals according to the ladder logic program. Timers consist of Accumulated Values and Preset Values. The timer intervals are stored in the Timer Accumulators and typically have three bases: (1) 1.0 seconds; (2) 0.1 seconds; and (3) 0.01 seconds. Timer status bits indicate whether the timer is enabled and whether it has timed out.

The Counter Data Table file 144 reflects the status of counters executing in the ladder logic program. Counters accumulate the number of events that occur in a ladder logic program, wherein an event is defined as the transition from a condition of "false" to "true". Counters consist of Accumulated Values and Preset Values. Counter status bits indicate the following: whether the counter has overflowed or underflowed; whether the Accumulator Value is greater than or equal to the Preset Value (i.e., "count complete"); an enable bit for "counter up" instructions; and an enable bit for "counter down" instructions.

The remaining Data Table files, Status 138, Bit 140, Control 146, Integer 148, and Floating Point 150, can perform a number of different functions. The various functions of these Data Table files are not essential to an understanding of the present invention.

The PLC uses addresses to refer to words and bits in the Data Tables files. The addresses allow a ladder logic program to identify Data Table files, elements therein, and bits of the elements. Addresses are generally expressed as "<file type> <file number>: <element>. <subelement>/ <bit number>". Thus, the address "B3:10/1" means "Bit file type; File #3; Element #10; Bit #1".

Addresses of elements in the Output Image 134 and Input Image 136 Data Table files are specified in octal format, i.e., 00-07 and 10-17 are valid bit addresses. All of the other file types use decimal addresses for elements. Bit type 140 Data Table files are "wordless". Addresses entered in a "word/bit" format are converted by the software package into a bit-only format. For example, if address B3:10/1 is entered by the user, the software package converts it to B3/161 (10 words×16 bits/words+1 bit). The Output Image 134, Input Image 136, and Status 138 files are unique in that their maximum sizes are set by the PLC processor type as shown in FIG. 8. The remaining file types 140-152 may contain a maximum of 1000 elements File types may be duplicated as needed to allocate storage space. For example, if more timers than the 1000 available in file "T4" are needed, file "T9" can be created. Ideally, the user would assign timers (or other variables) sequentially to conserve memory.

Figure 7:
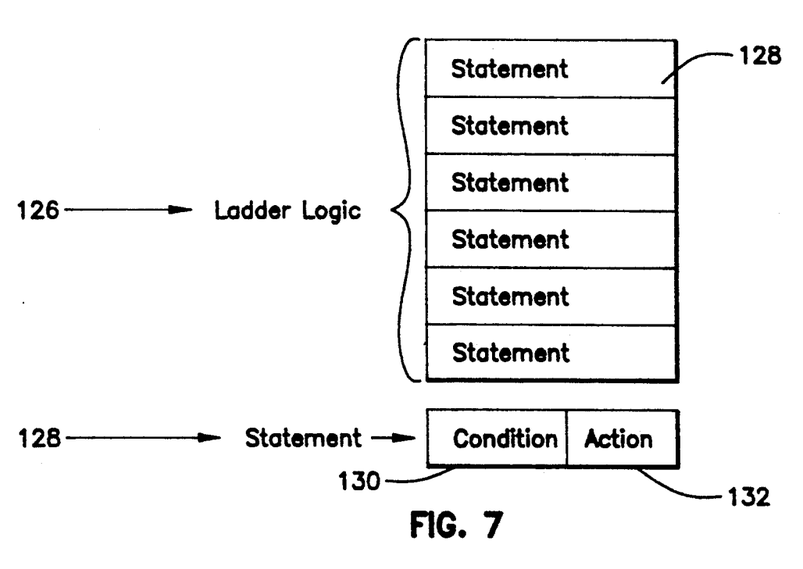
FIG. 7 is an illustration describing the structure of a ladder logic program in the programmable logic controller.

As shown in FIG. 7, the ladder logic program 126 scanned by the processor of the PLC (and used to control the PLC) is a group of statements 128. These statements 128 are often displayed to programmers in a graphical manner comprising ladder diagrams and functional block instructions. Each statement 128, or "rung" of the ladder logic program 126, consists of at least one condition test 130 and at least one action 132 to be performed when the condition 130 is met. When the condition 130 is met, the rung is "true" and some action 132 is taken, for example, a signal is transmitted, a counter is enabled, a timer is started, etc.

Figure 9:
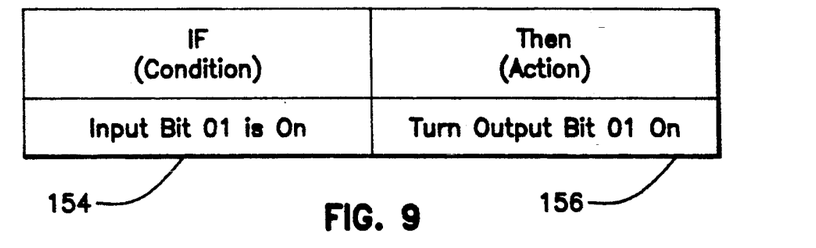
FIG. 9 is an illustration describing the structure of a ladder logic rung.

FIG. 9 shows an example "rung". If the input bit 01 has been turned "ON" 154 (i.e., a binary value of "1") by an input device, then the PLC responds by turning output bit 01 "ON" 156 (i.e., a binary value of "1").

The typical PLC is comprised of a number of categories of instructions, including a standard set of arithmetic, logical, move, diagnostic, register, comparison, and data transfer instructions, as would be found in any computer. Program control instructions are also available, allowing the user to structure the ladder logic programs.

In addition to the standard set of instructions, PLCs have a number of special-purpose machine control instructions. Relay-type instructions allow the PLC to monitor and control inputs and outputs for both digital and analog devices. Timer and counter instructions control interval timers and event counters. Sequencer instructions let the PLC monitor and control up to 16 I/O status bits at the same time. Immediate I/O instructions scan critical inputs or set critical outputs prior to normal I/O scans. Control instructions are available to let the PLC perform proportional, integral, and derivative (PID) control of processes and equipment.

In prior art ladder logic development systems, programmers can develop ladder logic programs on-line or off-line from the PLC, communicate with the PLC on-line to monitor the program's status, troubleshoot the ladder logic program, force the status of I/O status bits ON or OFF to simulate events, and perform a number of other functions. However, these prior art development systems offer little in the way of productivity aids for the ladder logic programmer and serve primarily as limited platforms for programming ladder logic.

SUMMARY OF THE INVENTION

To overcome the limitations in the prior art described above, and to overcome other limitations that will become apparent upon reading and understanding the present specification, the present invention discloses a method of emulating PLCs in a computer-based development system to speed the troubleshooting of ladder logic programs. The emulator executes a second ladder logic program. The second ladder logic program generates the inputs that drive the ladder logic program being debugged. The second ladder logic program is comprised of output instructions that drive input instructions in ladder logic program being debugged. Thus, the emulator simulates the operation of the programmable logic controller.

DESCRIPTION OF THE DRAWINGS

In the drawings, where like numerals refer to like elements throughout the several views.

DETAILED DESCRIPTION OF THE PREFERRED EMBODIMENT

In the following Detailed Description of the Preferred Embodiment, reference is made to the Drawings which form a part hereof, and in which is shown by way of illustration a specific embodiment in which the invention may be practiced. It is to be understood that other embodiments may be utilized and structural changes may be made without departing from the scope of the present invention.

GENERAL DESCRIPTION

The software package embodying the present invention is menu driven and is used to develop ladder logic programs for Programmable Logic Controllers (PLCs). The software package is a programmer's "tool box" for developing ladder logic programs and includes: (1) off-line program development; (2) off-line processor emulation; (3) on-line program development; and (4) on-line station monitoring. Off-line program development provides the user the ability to develop ladder logic programs without connection to a PLC processor. Off-line emulation provides a user the ability to execute and Debug ladder logic programs without the use of a PLC processor. On-line program development provides the user the ability to develop ladder logic programs while being connected to a PLC processor.

Additional information regarding this software package is available in the co-pending and commonly assigned patent applications "A METHOD AND APPARATUS FOR SYMBOLIC LADDER LOGIC PROGRAMMING WITH AUTOMATIC ATTACHMENT OF ADDRESSES", (application Ser. No. 07/374,487, pending) by Zifferer et al., "A METHOD AND APPARATUS FOR CROSS-REFERENCE SEARCHING IN LADDER LOGIC PROGRAMS", by Zifferer et al., (application Ser. No. 07/375,054, now abandoned), "A METHOD AND APPARATUS FOR CREATING CUSTOM DISPLAYS FOR MONITORING LADDER LOGIC PROGRAMS", (now U.S. Pat. No. 4,991,076), Zifferer et al., and "A METHOD AND APPARATUS FOR SECURING ACCESS TO A LADDER LOGIC PROGRAMMING AND MONITORING SYSTEM", (now U.S. Pat. No. 5,127,099) by Zifferer et al., all of which applications were filed on even date herewith, and all of which applications are hereby incorporated by reference.

DEFINITION OF EMULATION

The actual writing of a ladder logic program is only a small portion of the complete development cycle. Troubleshooting a new ladder logic program can involve considerable time and expense. During the course of ladder logic program development and troubleshooting, it is often beneficial to execute all or part of the ladder logic program without the use of PLC hardware. If an application is small, the traditional approach to ladder logic program troubleshooting uses a test box with switches and wired inputs. But as applications grow in size, the test box approach can quickly become unwieldy. In addition, when a ladder logic program is complex, it is scanned so quickly that individual operations cannot be properly observed.

The Emulator embodied in the software package is equipped with a number of sophisticated features that help users speed up the troubleshooting process. The purpose of the Emulator is to exercise the large majority of instructions in ladder logic programs without using any related hardware.

The Emulator was developed as a way to "work out the kinks" early in the ladder logic program development cycle. Without the Emulator, trapping ladder logic program errors is difficult at best. Typically, Data Table values, and the state of inputs and outputs, change as the errors occur. These changes invariably erase any of the clues helpful in tracking down problems. The Emulator, however, has powerful tools for isolating problems.

EMULATOR MODES

Figure 1:
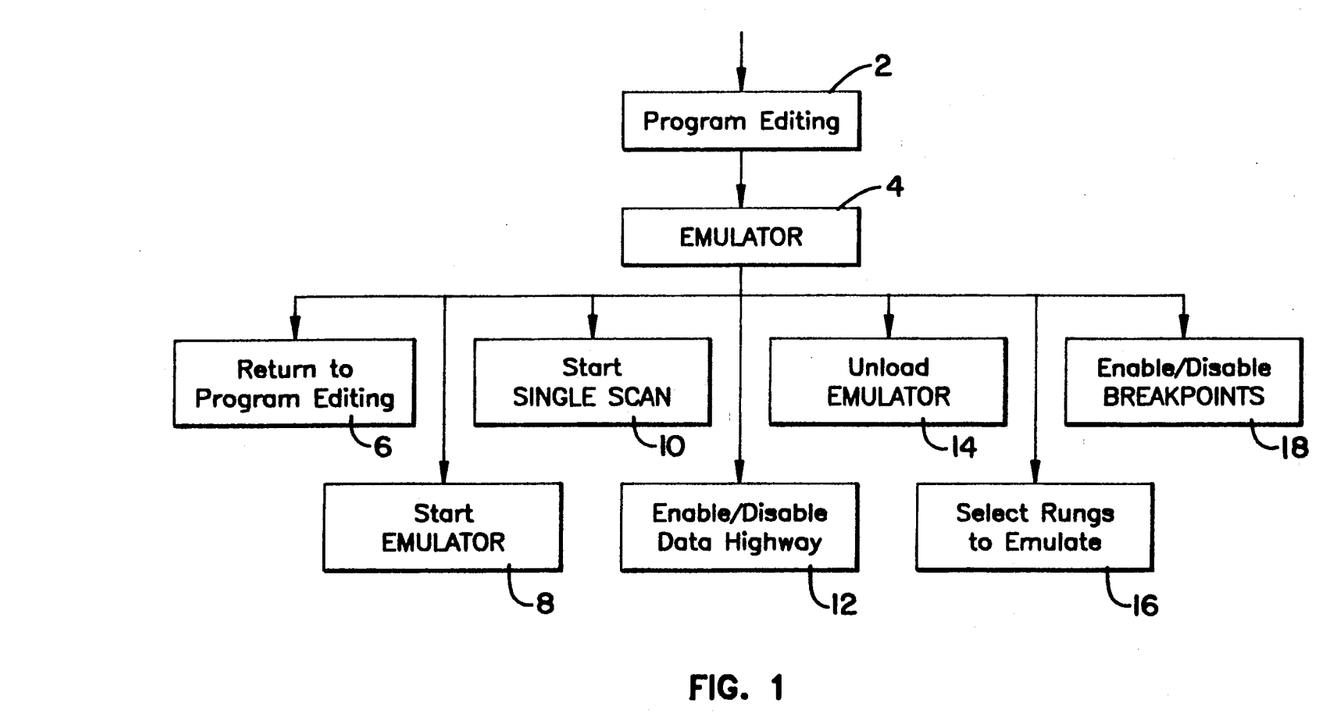
FIG. 1 is a block diagram describing the Emulator modes available in the present invention.
Figure 2:
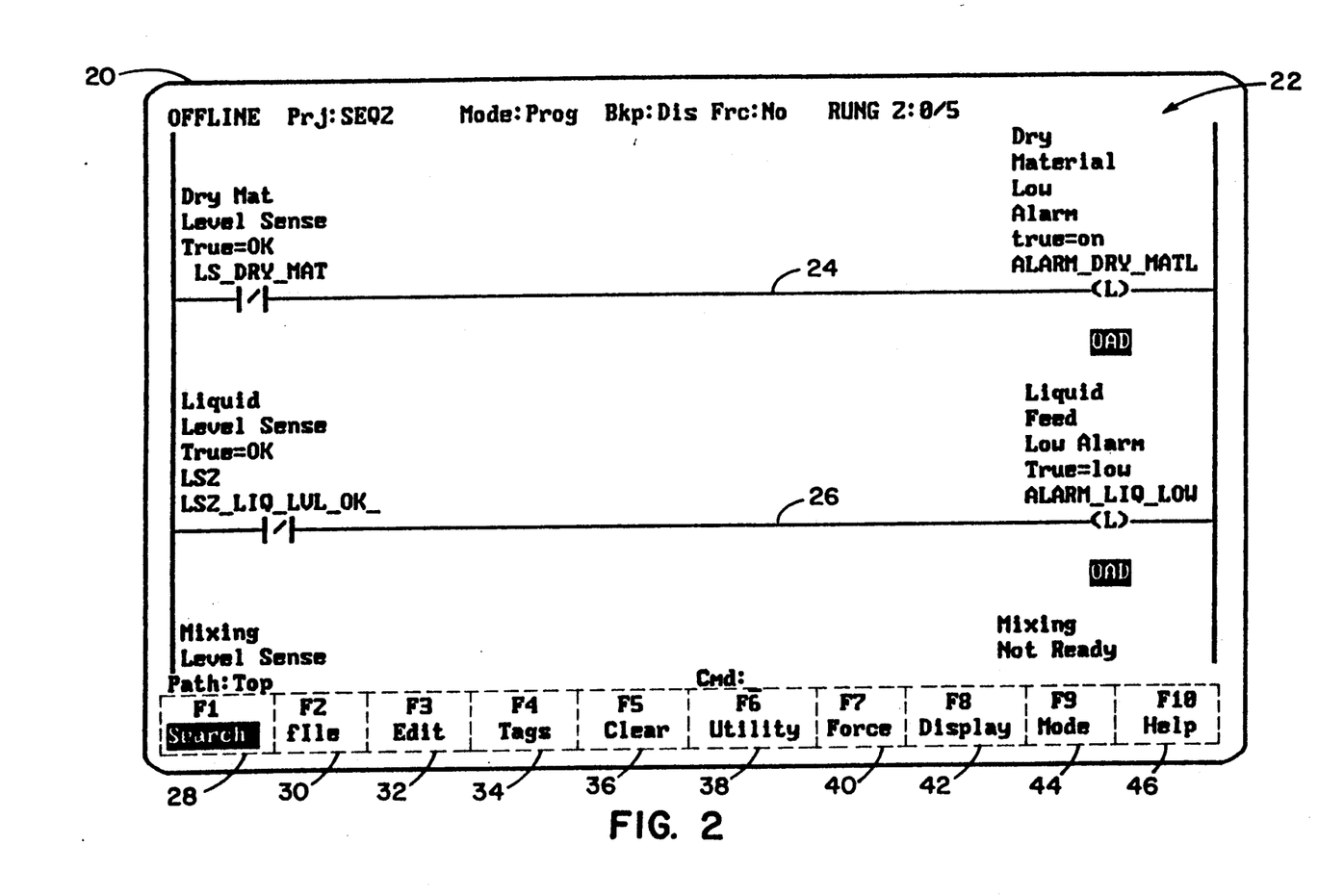
FIG. 2 is a blank screen where the user begins editing a ladder logic program.

FIG. 1 is a block diagram describing the Emulator modes 2-18 available in the present invention. FIG. 2 is a screen 20 where the user edits the ladder logic program 22. Above each function key identifier 28-46 across the bottom of FIG. 2, there is a description of the function performed by the key 28-46. When a function key 28-46 is selected by the user, the cursor highlights the particular function description.

Figure 3:
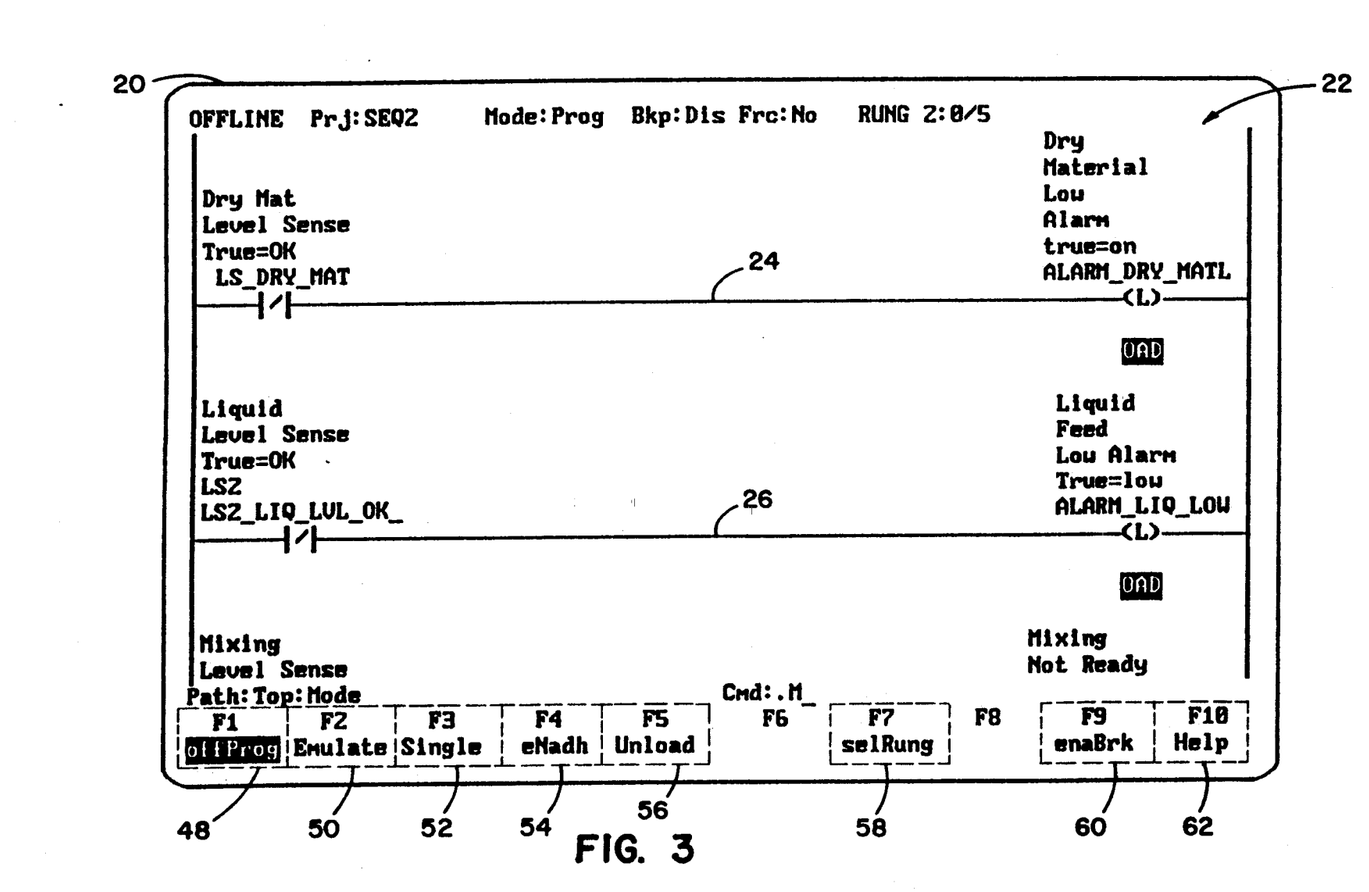
FIG. 3 is displayed when the F9 (Mode) key is pressed in FIG. 2 and shows an Emulator menu describing the functions available.

When the F9 (Mode) key 44 is pressed by the user, FIG. 3 is displayed. Across the bottom of FIG. 3 is an Emulator menu describing the functions 48-62 available. At this point, the user can begin troubleshooting a ladder logic program 22. The Program option, invoked by pressing the F1 (offProg) key 48, disables the Emulator and returns the user to the ladder logic program 22 of FIG. 2. The Emulate option, invoked by pressing the F2 (Emulate) key 50, loads and activates the Emulator. The Single Scan option, invoked by pressing the F3 (Single) key 52, activates the Emulator for one scan (only) of the ladder logic program 22. The Enable Data Highway option, invoked by pressing the F4 (eNadh) key 54, allows the user to enable or disable the data highway simulator for the Allen-Bradley PLC-2 controller. The Unload option, invoked by pressing the F5 (Unload) key 56, unloads the Emulator, thereby freeing up computer memory. The Select Rungs option, invoked by pressing the F7 (Selrung) key 58, allows the user to specify a block of rungs for the Emulator to scar The Enable Breakpoints option, invoked by pressing the F9 (enaBrk) key 60, allows the user to enable or disable breakpoint occurrences.

DEVELOPING AND USING DEBUG FILES

The Emulator uses "reverse" ladder logic programs stored in Debug files. Debug files are different from the main ladder logic program files in that they are not transferred to the PLC processor during a download. The Debug files, and their associated Data Table files, can be as large and as sophisticated as necessary, because they do not use any memory in the PLC.

A Debug file is modeled after the particular machine functions performed by the main ladder logic program. To accomplish this, the Debug file is comprised of ladder logic programming that "drives" the inputs to the main ladder logic program. The Emulator causes the Debug file to be scanned concurrently with the scan of the main ladder logic program file.

While only one Debug file can be designated at a timer the user can develop a number of Debug files that can be used independently, or, dependently as Debug subroutine files. Thus, many separate Debug files can be created, permitting the user to develop separate files for separate parts of a ladder logic program. Maintaining a number of separate Debug files allows the user can switch rapidly between tests; there is no need to continuously modify a single Debug file.

Multiple Debug files also let the user troubleshoot the main ladder logic program as smaller sections. Each section can then operate independently of other sections. As an example, consider the situation where the ladder logic program contains interrelated math instructions. In this case, a complex algorithm in the main ladder logic program can be separated into sections so that intermediate results can be examined.

CREATING DEBUG FILES

FIG. 2 shows the rungs 24 and 26 from the ladder logic program 22. To create a corresponding Debug ladder logic program file, the user begins the editing process on a Debug file in the same way as a normal ladder logic program.

DEBUG FILE EXAMPLE

As a brief example of the use of Debug files, consider the following scenario. In normal machine operation, an output from the PLC might open a solenoid valve, which extends an arm attached to a hydraulic cylinder. As the arm reaches the end of its travel, a limit switch trips, which de-energizes the output, closes the valve, and stops arm travel. When the arm is in position, the system continues through its cycle.

With the Emulator, troubleshooting ladder logic programs can be more thorough and convenient because it is done in the user's office, rather than on the shop floor. However, use of the Emulator does require a thorough understanding of machine operations since the user must build the Debug files that respond correctly to events in the main ladder logic program.

The Debug file in the example must recognize when the solenoid valve output is energized, and then introduce some delay to simulate the arm extension. At the conclusion of the delay, an input signal must be sent to simulate the closure of the limit switch.

Figure 4:
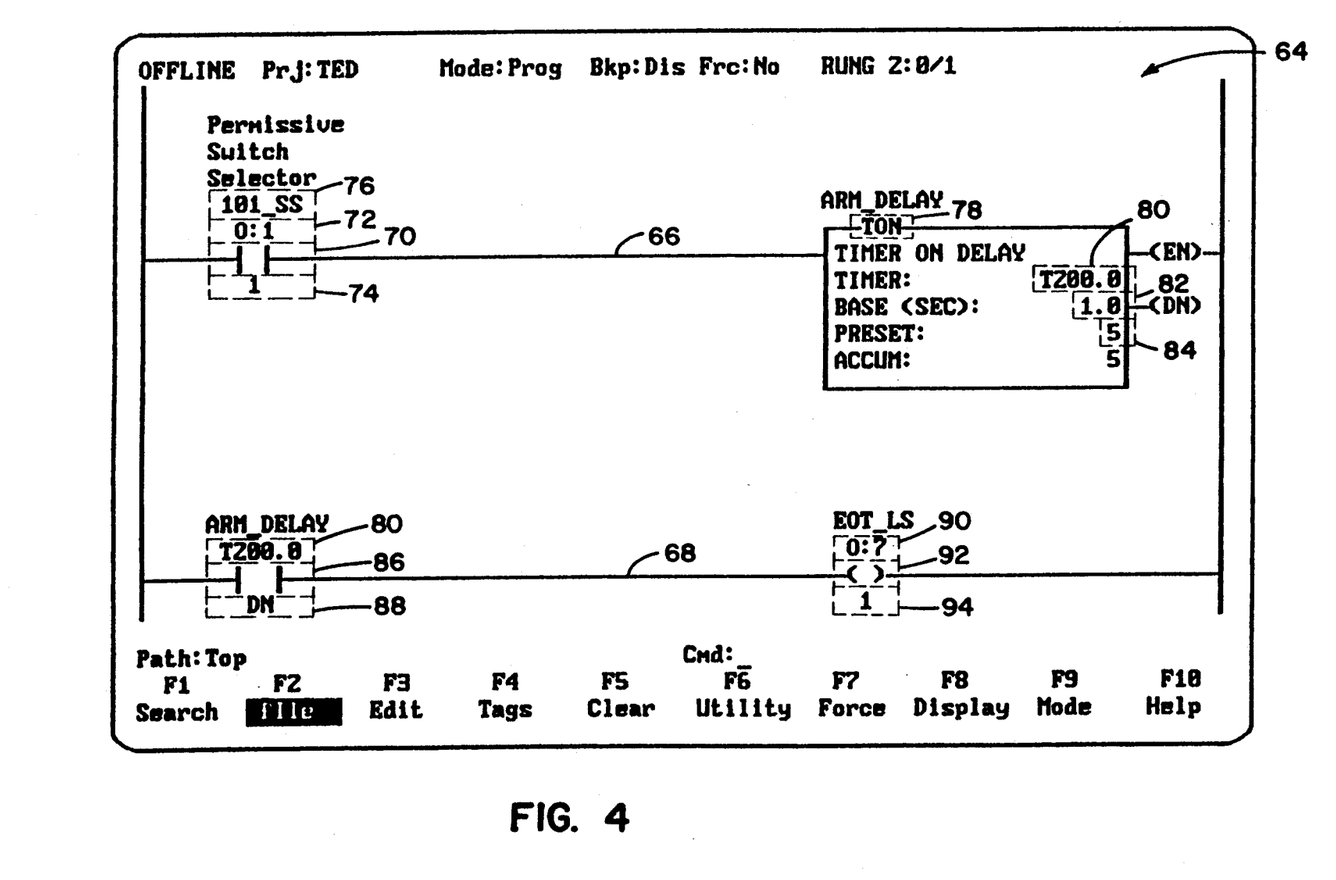
FIG. 4 shows a plurality of ladder logic rungs from a Debug program file.

FIG. 4 shows the corresponding rungs 66 and 68 from a Debug ladder logic program 64. The purpose of the first rung 66 in FIG. 4 is to read the status of the solenoid output bit 72 and 74 in the Output Image Data Table file used by the main ladder logic program and then start a timer 76 when the output bit 72 and 74 is set. The Examine If Closed (XIC) instruction 70 is used with the same address 72 and 74 or symbol 76 as the output bit connected to the solenoid valve. The Timer on Delay (TON) instruction 78 is used to simulate the cylinder travel delay. The TON instruction 76 is programmed with an available timer address 78 specifying a suitable delay 82 and 84.

The purpose of the second rung 68 in FIG. 4 is to monitor the timer's "done" bit 80 and 88 and then simulate the closure of the limit switch 92. The Examine If Closed (XIC) instruction 86 is used to reference the timer's "done" bit 80 and 88. The Output Energize (OTE) instruction 92 is used to set the bit 90 and 94 associated with the limit switch in the Input Image Data Table file used by the main ladder logic program.

Figure 10:
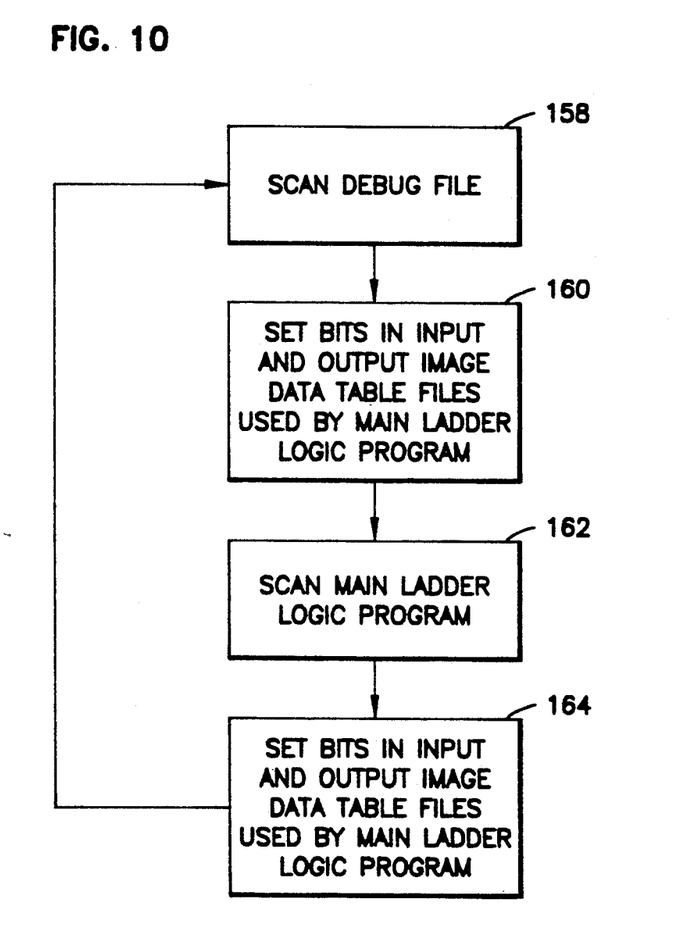
FIG. 10 is a flow chart describing the operation of the Emulator.

FIG. 10 shows a flowchart describing the operation of the Emulator. The Emulator scans the rungs in the Debug file (158), setting bits in the Input Image and Output Image Data Table files used by the main ladder logic program (160). These bits, in a real-world system, would be set by I/O modules connected to the PLC. The Emulator then scans the main ladder logic program (162), wherein the bit settings from the Input Image and Output Image Data Table files "drive" the program (164). Thus, the main ladder logic program will act as though it is connected to a fully wired machine.

LIMIT EXECUTION TO A BLOCK OF RUNGS

For more complex ladder logic programs, devising a script that can handle all the possible series of events can be difficult. The user is advised to work with smaller segments of the ladder logic program, and begin by developing a list of all the inputs that drive the segment. The user should continue this process by developing a schedule of when each of the inputs are to be on or off.

While smaller segments are a first step, the Emulator provides additional help for large and complex ladder logic programs. As described herein before, the Select Rungs option can be invoked by pressing the F7 (Selrung) key 58 at the screen 20 shown in FIG. 3. The Emulator provides the ability to selectively execute only selected ladder logic rungs. Ladder logic rungs that are not selected are ignored. This feature allows users to isolate specific sections of the logic ladder program 22.

SINGLE SCAN MODE

Usually, the Emulator operates in a Continuous Scan mode, wherein the main ladder logic program is continuously executed. However, on some occasions it is helpful to observe what happens to the ladder logic program as it changes from scan to scan. This is when the Single Scan mode comes most helpful. As described herein earlier, the Single Scan mode is invoked by pressing the F3 (Single) key 52 at the screen 20 shown in FIG. 3. Each time that the user presses the invokes the Single Scan mode, the ladder logic program 22 is executed once from the top and then stops. The user is then free to examine the status of rungs or the contents of Data Table files. The user may also elect to enter and enable Breakpoints, switch into the Continuous Scan mode, or instruct the Emulator to make one more Single Scan.

BREAKPOINTS

The Emulator also provides an instruction designed to help the user find the causes of errors. This instruction is called a Breakpoint (BKP). Breakpoint instructions are used to freeze the state of the main ladder logic program during execution. As described herein before, the user can enable or disable the Breakpoint instructions by pressing the F9 key 60 at the screen 20 shown in FIG. 3. Note that the legend above the F9 function key 60 shows "(enaBrk)" when the Breakpoint instructions are disabled and "(Disbrk)" when the Breakpoint instructions are enabled.

Figure 5:
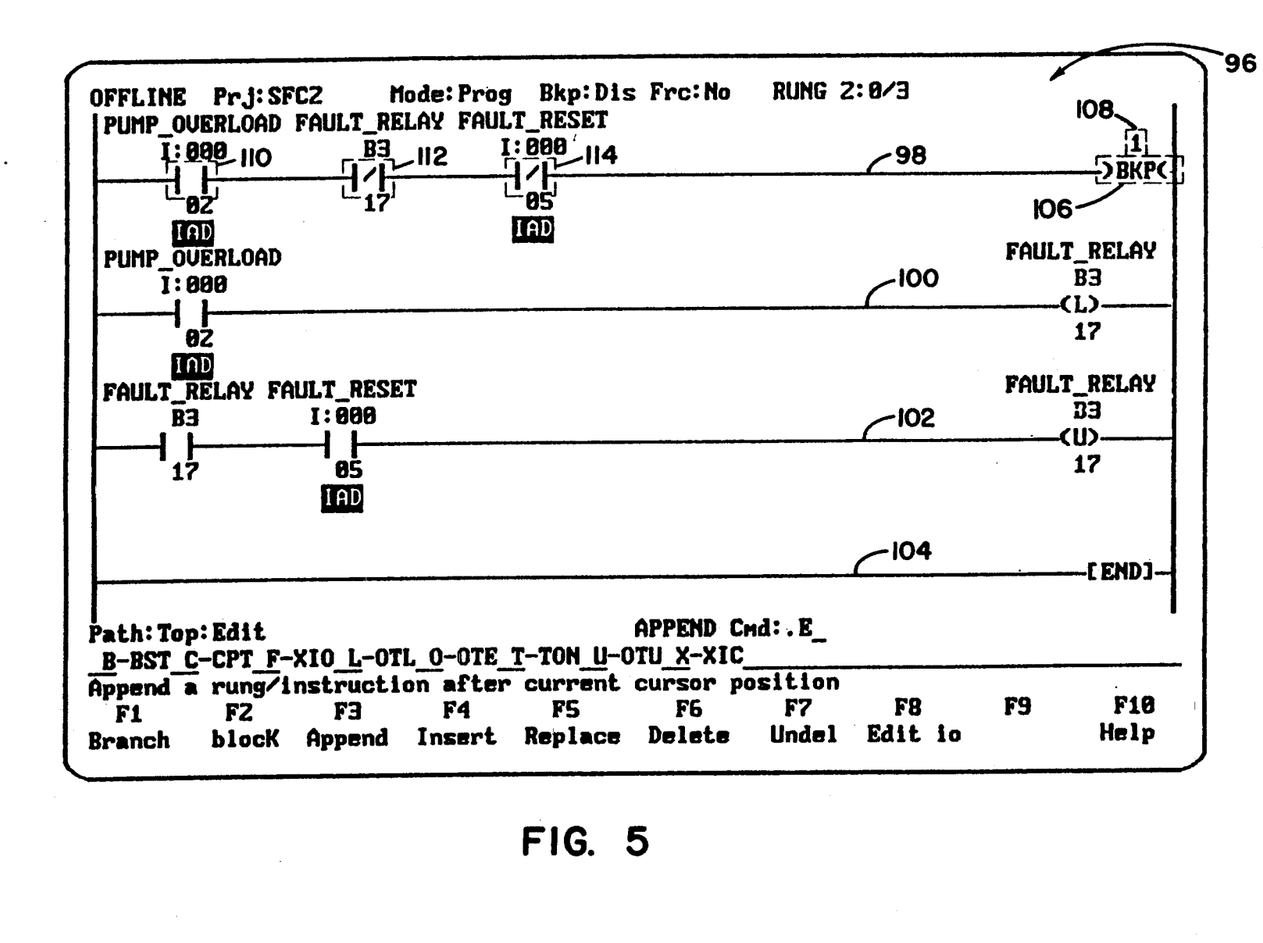
FIG. 5 shows an example Breakpoint rung in a ladder logic program.

FIG. 5 shows an example Breakpoint rung 98 in a ladder logic program 96. Breakpoint rungs 98 can be placed anywhere in the ladder logic program 96. When a rung 98 containing the Breakpoint output instruction 106 becomes "true" (i.e., the conditions 110, 112 and 114 tested for are met), the scan of the ladder logic program 96 terminates and the Emulator is placed in the Single Scan mode. The user is then free to examine the various elements of the ladder logic program 96.

To use the Breakpoint instruction 106, the user constructs a ladder logic rung 98 that performs some conditional test, for example, 110, 112, and 114. The output of the rung 98 must be a Breakpoint instruction 106. The Breakpoint instruction 106 is assigned a unique number 108, so that the user can quickly identify it when it is executed. When the condition 110, 112 and 114 is met, making the rung 98 "true", the Breakpoint instruction 106 is executed. At this point, the user has "trapped" the condition suspected of causing the problem. A plurality of Breakpoint instructions 106 can be added to a ladder logic program 96, each testing for a plurality of different conditions 110, 112 and 114. Breakpoint instructions 106 identify themselves by rung number when they execute.

For the Breakpoint instruction 106 to execute, the rung 98 containing it must go "true". The Breakpoint rung 98 should contain some conditional checks 110, 112 and 114, otherwise the rung 98 is always "true" and the Breakpoint instruction 106 will execute every time that rung 98 is scanned.

Note that the Breakpoint rung 98 should be removed or disabled before attempting to restart the Emulator, otherwise the ladder logic program 96 will stop repeatedly at the same active Breakpoint instruction 106.

CONCLUSION

Although a specific embodiment of the present invention has been illustrated herein, it will be appreciated by those in ordinary skill in the art that any method or arrangement which is calculated to achieve the same purpose may be substituted for the specific embodiment shown. Thus, the present invention disclosed herein may be implemented through the use of different display screens, different commands, different key combinations, and different steps. This application is intended to cover any adaptations or variations thereof. Therefore, it is manifestly intended that this invention be limited only by the claims and the equivalence thereof.

What is claimed is:

1. A method in a computer-based development system for emulating a programmable logic controller for debugging a first ladder logic program wherein a second ladder logic program modeled after a particular machine function is provided as a debug program, the method comprising the steps of:

(a) executing the first ladder logic program and the debug program in the computer-based development system;

(b) scanning one or more rungs in the debug system to generate inputs for driving the first ladder logic program wherein the inputs emulate signals from I/O devices, and storing the inputs as values in an input image data table file for the first ladder logic program;

(c) scanning one or more rungs of the first ladder logic program to generate outputs for driving the debug program wherein the outputs emulate signals to I/O devices and storing said outputs as values in an output image data table file for the first ladder logic program;

(d) comparing, in the debug program, the outputs to a selected response by examining the values in the output image data table file for the first ladder logic program; and (e) scanning one or more rungs in the debug program to generate additional inputs for driving the first ladder logic program according to the results of the comparing step (d) wherein the additional inputs emulate signals from I/O devices and storing the additional inputs as values in the input image data table file for the first ladder logic program.

2. A method as recited in claim 1 wherein the first ladder logic program is transferred to a programmable logic controller for execution and wherein the debug program and its associated data table files remain in the computer-based development system, thereby being as large and as sophisticated as necessary to model a particular machine function.

3. A method as recited in claim 1 wherein an user can develop a plurality of debug programs that can be used independently and dependently for separate parts of the first ladder logic program.

4. A method as recited in claim 1 further comprising the steps of:

dividing the first ladder logic program into a plurality of small segments;

developing a list of inputs for driving a particular segment of the first ladder logic program;

developing a schedule of when each of the inputs are to be on or off; and selectively executing selected rungs of the first ladder logic program.

5. A method as recited in claim 4 further comprising the step of invoking a single scan when the first ladder logic program is executed once and stops.

6. A method as recited in claim 4 further comprising the steps of:

constructing a ladder logic rung in the first ladder logic program that performs a conditional test and has a breakpoint instruction as its output;

executing the breakpoint instruction in response to the conditional test making the rung true; and trapping a condition suspected of causing a problem.

7. A method as recited in claim 6 further comprising the steps of:

adding a plurality of breakpoint instructions to the first ladder logic program; and testing a plurality of different conditions for a true condition and executing a breakpoint in response thereto.

* * * * *

UNITED STATES PATENT AND TRADEMARK OFFICE
CERTIFICATE OF CORRECTION

PATENT NO. : 5,276,811
DATED : January 4, 1994
INVENTOR(S) : Scott C. Zifferer et al.

It is certified that error appears in the above-identified patent and that said Letters Patent is hereby corrected as shown below:

Column 1, line 26, after "device" insert a period --.--.  Column 2, line 55, after "elements" insert a period --.--.  Column 4, line 50, "07/375,054" should read --07/375,059--; line 54, after the comma (",") (first occurrence), insert --by--.  Column 5, line 54, "scar" should read --scan.--  Column 7, line 38, "Scar" should read --Scan--.  Column 8, line 57, after "debug", "system" should read --program--.

Signed and Sealed this

Twenty-eighth Day of June, 1994

Attest:

BRUCE LEHMAN

Attesting Officer

Commissioner of Patents and Trademarks